United States Patent [19]

Forseen et al.

[11] 4,011,061

[45] Mar. 8, 1977

[54] ARTICLES PROVIDING SUSTAINED RELEASE AND METHOD OF MAKING

[75] Inventors: Roger K. Forseen, Mahtomedi; David A. Hofacker, St. Paul, both of Minn.

[73] Assignee: Minnesota Mining and Manufacturing Company, St. Paul, Minn.

[22] Filed: Mar. 20, 1975

[21] Appl. No.: 560,540

[52] U.S. Cl. .................................... 71/29; 71/27; 71/33; 71/64 F; 424/19; 427/407 C; 427/416

[51] Int. Cl.$^2$ .................... C05C 9/00; C05G 3/00

[58] Field of Search .................. 71/1, 27, 28–30, 71/64 E, 64 F, 33, 34; 427/402, 407, 416; 424/19, 32, 38

[56] References Cited

UNITED STATES PATENTS

| | | | |
|---|---|---|---|
| 3,192,031 | 6/1965 | Zaayenga | 71/28 |
| 3,223,518 | 12/1965 | Hansen | 71/64 E |
| 3,306,730 | 2/1967 | Malmberg | 71/64 E |
| R27,238 | 11/1971 | Stansbury | 71/64 D X |

FOREIGN PATENTS OR APPLICATIONS 10,966     1972     Japan ............................ 71/64 E

*Primary Examiner*—Frank A. Spear, Jr.
*Assistant Examiner*—Ferris H. Lander
*Attorney, Agent, or Firm*—Cruzan Alexander; Donald M. Sell; Warren R. Bovee

[57] ABSTRACT

Articles for providing sustained release of water-soluble components. The articles comprise agglomerate particles comprising an organophobic water-soluble nucleus particle surrounded by smaller, clinging organophilic particles. The agglomerate particles are bound into a coherent mass, such as a tablet, by an organic, water-insoluble binder. The release characteristics of the articles can be selectively controlled by controlling the type and relative amount of the organophilic particles employed. The articles can be made by dry-blending the solid ingredients and forming and fusing the blended mass.

20 Claims, No Drawings

ARTICLES PROVIDING SUSTAINED RELEASE AND METHOD OF MAKING

This invention relates to articles which will release water-soluble chemicals to a moist environment over a time period which can be controllably varied to provide the maximum beneficial effect from release of the chemicals. The articles comprise a plurality of agglomerate particles, each agglomerate particle comprising a water-soluble nucleus surrounded by organophilic particles clinging to the individual nucleus particles. The organo-agglomerate particles are coated and bound into a coherent mass by a water permeable matrix of water insoluble, film-forming resin. Articles are disclosed which are particularly suitable for providing agricultural chemicals to the soil at a controllable, uniform rate in order to promote or otherwise aid in controlling plant growth.

A method of making the articles of the present invention is also disclosed.

Various chemicals to promote or otherwise control the growth of plant life (agricultural chemicals or "agrichemicals") have long been known. These chemicals have been conventionally applied to the soil by broadcasting or dusting if solid, or spraying if liquid. Application of the chemicals in this manner is often unsatisfactory. Rainwater can carry away the chemicals before they are assimilated by the plants and can also cause undesirable drainage of the chemicals into streams and lakes, thereby polluting the waters. If a large amount of the chemicals are added to the soil, harm can result. For example, excess fertilizer can "burn" the plants. Conversely, if not enough of the chemical can be provided in a single application, repeated applications may be required during a single growing season.

To overcome the above-noted disadvantages, various coatings and binders for agricultural chemicals have been developed to regulate release of the chemicals when exposed to moisture. Thus, agricultural chemicals have been loaded in perforated polyethylene film capsules (U.S. Pat. No. 3,059,379) and coated or impregnated with solid hydrocarbons (U.S. Pat. No. 3,219,433) and waxes (U.S. Pat. No. 2,936,226, U.S. Pat. No. 3,242,337, and U.S. Pat. No. 3,285,733). Tablets of agricultural chemicals using wax matrices require relatively large amounts of wax to provide the necessary "water resistance" and the degree of water resistance is difficult to control. Sometimes the water-soluble chemical particles are completely encapsulated and become insoluble in water, while at other times the particles are not wet by the wax and their solubility is not retarded at all.

Another technique of regulating presentation of fertilizer to the soil is disclosed in U.S. Pat. No. 3,223,518 and comprises coating a core granule, pellet or prill of fertilizer with a plurality of coatings to delay and effect gradual release of the water-soluble plant nutrients contained in the fertilizer. Clay, diatomaceous earth, finely divided asbestos and the like are disclosed as being incorporated into the primer coating to assist adhesion of the primer coating to the coated granular substrate and to the subsequent encapsulating coatings.

According to the present invention there is provided articles such as tablets, balls, pellets, etc., containing solid particles of water-soluble, organophobic active ingredient wherein the composition of the articles can be formulated to provide controlled, uniform beneficial release characteristics in a moist environment. Articles containing agrichemicals such as fertilizers, herbicides, pesticides, plant growth regulators and the like are particularly useful.

The articles of the present invention are coherent, solid masses which comprise a plurality of agglomerate particles each comprising organophobic, water-soluble nucleus paritcles surrounded by a discontinuous layer of organophilic wetting agent comprising organophilic particles clinging to, and preferably in direct contact with, the organophobic nucleus particles. The organophilic particles are less than about one-tenth the size of the nucleus particles. The agglomerate particles are coated and maintained as a solid, coherent mass by a water-permeable matrix of water-insoluble binder which is preferably a film-forming organic resin binder. A preferred embodiment of the invention comprises agglomerate particles comprising organophobic, water-soluble nucleus particles and organophilic particles clinging thereto wherein the exposed surface of said agglomerate particles consists of portions of the surface of the organophobic nucleus particles and portions of the surface of the organophiliic particles. These articles provide uniform, sustained release of the water soluble materials contained therein and provide means by which the release rate can be selected and carefully controlled as will be discussed in greater detail hereinafter.

The articles of this invention can be conveniently prepared by homogeneously dry-blending organophobic, water-soluble nucleus particles, smaller organophilic particles and water-insoluble organic binder in the solid, particulate form. The admixture is then formed under pressure and heated to cause the binder to flow and coat agglomerate particles. On cooling, a solid coherent article is provided comprising agglomerate particles, containing a water-soluble nucleus, bound in a solid, water-permeable matrix of water-insoluble binder. The resulting article is capable of uniformly sustaining release of the water-soluble component over a selected period of time when exposed to a moist environment.

As noted previously, film forming binders have been used to decrease the water solubility of various water-soluble chemicals including agrichemicals. The previously known disadvantages, e.g. the need for large quantities of binder or a plurality of coatings, incomplete and non-uniform coating and non-uniform uncontrollable release rates, etc., have been overcome in the present invention through the use of articles containing the aforementioned agglomerate particles. It has been discovered that the use of these unique agglomerate particles surprisingly decreases by many times the release rate of the water-soluble component from articles comprising a given binder/water-soluble particle mixture, often by a factor of 10 times or more.

It is understandable that the addition of a water-insoluble binder material, such as polyethelene, would decrease water solubility by an encapsulation or "barrier" effect; however, the discovery that finely divided, organophilic particles would futher enhance and control this effect was quite unexpected. Moreover, the nature of the agglomerate particles provides means by which the release rate can be conveniently and reproducibly selected and controlled to provide an article having a reproducible sustained release.

As used herein, the term "agglomerate particle" refers to a composite particle comprising at least two different types of particles. "Sustained release" refers to the prolonged release of water-soluble material from one article when compared with another under identical conditions. Articles prepared using the organophilic particles of the present invention provide prolonged or "sustained release" in a moist environment when compared with articles having the same binder/water-soluble-component weight ratio, but without the organophilic particles.

The superior, reproducible sustained release characteristics provided by the articles of the present invention are believed due to the use of the aforementioned organophilic particles acting as a discontinuous wetting agent layer on the agglomerate particles. Microscopic examination of preferred articles prepared according to the invention shows that the agglomerate particles comprises organophilic particles clinging directly to, and at least partially covering, the surface of the organophobic nucleus particles. The organophilic particles act as a discontinuous wetting agent layer for the organic binder, thereby providing agglomerate particles presenting a differentially wettable surface to the organic binder material. The binder will selectively wet the organophilic portions of the agglomerate particles while the exposed organophobic surface of the nucleus particles is not readily and completely wet by the binder. The water soluble nucleus is therefore vulnerable to attack by moisture since the agglomerate particles are not fully coated with a continuous layer of the water insoluble binder. By increasing the number of organophilic particles on the surface of the organophobic nucleus particles, the coverage of the agglomerate particles by water insoluble binder is increased and the area open to attack by water is decreased, providing a convenient means for reproducibly controlling water permeability and thereby controlling the release rate of the water soluble material from the article.

Even if the surface of the organophobic, nucleus particles were substantially covered by organophilic particles, it is believed the binder would not form a continuous coating around the agglomerate particles and encapsulate them and render them water-insoluble. This is due to the inability of the clinging, organophilic particles to pack perfectly and present a continuous organophilic surface to the binder. There are always open pathways between the organophilic particles at the surface of the agglomerate particles, and the binder does not completely bridge all of the organophilic particles to form a continuous film encapsulating the agglomerate particles, unless an excessive amount of binder is used.

The binder serves to bind the agglomerate particles in a rigid, water-insoluble matrix and, unless an excessive amount of binder is used, the aforementioned differential wetting effect provides pores and channels throughout the matrix and in combination with the organophobic, water-soluble nucleus particles. The articles can undergo leaching at a selected, uniform rate to provide sustained release of the water-soluble materials contained therein. By proper selection of the release rate of the water-soluble materials maximum benefit to the surrounding environment is achieved.

The particulate, organophobic, water-soluble materials which comprise the core or nucleus of the agglomerate particles of the present invention are per se well known in the art. As used herein, "water soluble" refers to materials which have a measurable dissolution rate in water. The invention works with equal facility to sustain the release of slowly or readily solubilized particulate materials in a moist environment.

Especially preferred are solid, water-soluble materials which are non-hygroscopic and non-hydrated. Particularly useful in the present invention are the agrichemicals such as fertilizers, herbicides, pesticides, growth regulators and the like. Typical of the salts used for fertilizers are urea and its derivatives, ammonium nitrate, ammonium sulfate, mono- and diammonium phosphate, potassium chloride, potassium sulfate, potassium nitrate, monopotassium phosphate, sodium nitrate, calcium cyanamide, superphosphate (a mixture of calcium acid phosphate and calcium sulfate), and triple superphosphate (calcium acid phosphate) or mixtures thereof. Herbicides and pesticides such as salts of dichlorophenoxy acetic acid (2,4-D) and trichlorophenoxy acetic acid (2,4,5-T), the sodium salts of trichloroacetic acid and endothall and chlormequat (e.g. CYCOCEL, available commercially from American Cyanamid) may also be used with advantage.

For most applications the organophonic, water-soluble, nucleus particles can be in any convenient size range from about 100 to 600 micrometers. Articles can be prepared from mixtures of particles having a very narrow size range of relatively large particles, e.g. 250–400 micrometers, or relatively small particles, e.g., 100–150 micrometers. Mixtures of particles having a wide size range, e.g. 100 to 600 micrometers, can also be used. In practice, the particles are generally sorted by screening and may comprise, for example, −30 +40 mesh (particles which will pass through a 30 mesh screen but are retained on a 40 mesh screen, i.e. particles of about 420 to 595 micrometers), −40 +60 mesh (particles of about 250 to 420 micrometers) or −100 +140 mesh (particles of about 105 to 149 micrometers). For preparing pellets and tablets, particles in the 250 to 420 micrometer size range are preferred.

The organophilic particles used herein are critical to providing the superior release properties characteristic of the articles of this invention. The presence of these clinging organophilic particles as well as the character and amount of the particles is responsible for the surprising results obtained. The control and selection of these particles is a key factor in controlling the release characteristics of the articles of this invention.

The organophilic particles are characterized by having a surface which is readily wet by the water-insoluble, organic binder material. The greater the degree of organophilicity, the more efficiently the organophilic particles will operate to attract the binder material to the surface of the agglomerate particles and the greater the release sustaining characteristics of a given composition.

In order to determine whether a given particulate material is organophilic, a convenient test is available to determine the wetting characteristics of the surface of the particles. This test is the "Standard Method of Test for Oil Absorption of Pigments by Spatula Rub-Out" and is designated as ASTM (American Society for Testing and Materials) D 281-31. This test measures the ability of a particulate material to absorb raw linseed oil. The results obtained by this test correlate with the ability of the organophilic particles to be wet by the organic binder materials used herein. It is preferred that the organophilic particles used in the present invention are able to absorb at least 30 grams of oil per 100 grams of particles and most preferably at least 40 grams per 100 grams of particles.

Materials which meet the above requirements are exemplified by clays, such as bentonite and kaolin clay; cement compositions, such as plaster of Paris and Portland cement; colloidal magnesium silicates; materials, such as argillite, quartzite, dactite, diabase, and micronized silica; activated charcoal; vermiculite and the various known talcs. The talcs are preferred and are readily available from a variety of commercial sources.

The organophilic particles must be of an appropriate size so that they can uniformly surround the organophobic, water soluble nucleus particles to form the agglomerate particles. Accordingly, there must be a significant size differential between the organophilic particles and the organophobic nucleus particles. The nucleus particles should be at least 10 times the size of the organophilic particles. More preferably the nucleus particles are at least about 20 times, and can be more than 100 times, the size of the organophilic particles. It is especially preferred that the nucleus particles are 50 to 100 times the size of the surrounding organophilic particles. Thus, for organophobic nucleus particles in the 100 to 600 micrometer size range, the organophilic particles can range from less than about 1 to about 60 micrometers. A preferred mixture of particles within this size range comprises a particle mixture having a median particle size of about 5 micrometers or less. By "median" particle size it is meant that 50 percent by weight of the particles are larger than the given size and 50 percent are smaller.

The materials useful as binders in the present invention can be any of the known organic, film-forming binders which are water-insoluble and which are capable of existing in, or passing through, a fluid state at temperatures below the degradation temperature of the other components comprising the articles of this invention. Thermoplastic, film-forming resins having the desired melting points are particularly preferred for use in this invention. Also useful are solid monomers or prepolymers which pass through a liquid state prior to polymerizing to a solid polymer.

The viscosity of the binding materials in the fluid state should be sufficiently low at the temperatures at which the articles are molded and/or fused so that the resin will easily flow and uniformly coat the admixed agglomerate particles. It has been found that materials which have a liquid viscosity in the range of 250 to 750 centipoise (Brookfield THERMOSEL viscometer, No. 18 LV series spindle) at the selected article molding temperature are particularly preferred. Materials having viscosity characteristics outside this range may also be used, but are less preferred. Materials having too high a viscosity will not flow sufficiently to coat all of the agglomerate particles in the article. Materials having a viscosity which is too low tend to flow too readily and may "puddle" at the lower surface of the article during fusion. Either condition can result in articles which release the water-soluble content too rapidly or in a non-uniform rate.

Film forming polyethylene resins, such as the low molecular weight (e.g. 1500 – 4000 mw) polyethylene resins having a melting point between about 100° and 110° C. have been found particularly suitable for use in the present invention, either alone or in combination with other resins. Other filmforming resins which exemplify those useful in the practice of the present invention are the solid hydrocarbons, petroleum waxes (e.g. microcrystalline wax, and most preferably paraffin wax; see Col. 8, U.S. Pat. No. 3,285,733, and Col. 1, U.S. Pat. No. 2,936,226; and crystalline and microcrystalline amorphous waxes), petroleum resins and petroleum asphalt-paraffin wax mixtures. Other resins which can be blended with the filmforming binders are the polyterpene resins such as "Piccolyte" S-85, (m.p. 85° C.) available commercially from Hercules Powder Co., Inc., "Wingtack" 95, a synthetic polyterpene resin (m.p. 95° ± 5° C.) available commercially from Goodyear, "Piccotac" B, an aliphatic hydrocarbon resin (m.p. 96°–103° C.) available commercially from Hercules.

Once the desired ingredients have been selected, the release characteristics of the articles prepared therefrom can be altered by controlling the relative amounts, by weight, of the organophobic, water-soluble, active ingredient particles, organophilic particles and binder. The amount of binder to be used in any given article is generally dictated by practical considerations. There must be at least sufficient binder resin to coat and bind the agglomerate particles. Increasing the amount of binder generally decreases the release rate of the articles; however, a binder level of about 30% by weight, based on the total article weight, is a practical upper limit from a processing standpoint since higher concentrations of binder may cause the composition to become excessively sticky during liquefaction of the binder and may adversely affect the processing equipment. In a preferred embodiment of the present invention the amount of binder and organophilic particles combined, based on the total weight, is at least about 10% by weight and can be up to about 35% by weight and most preferably is between about 20 and 30% by weight.

Selecting the proper weight ratio of binder to organophilic particles is important in controlling the release characteristics of the articles of this invention. There must be sufficient binder to be adsorbed onto the organophilic portion of the agglomerate particles with some excess left over to form a matrix having sufficient integrity to bind the individual agglomerate particles together. The minimum amount of binder required is somewhat dependent on the oil absorption properties of the organophilic particles. It follows that since the required lower limit for oil absorption is about 30 grams oil/100 grams of organophilic particles, the minimum weight ratio of binder to organophilic particles useful in the present invention is about 0.3 to 1. The preferred weight ratio is about 1 to 1, assuming the use of organophilic particles have an oil absorption value in the 30 to 40 grams/100 grams range.

A second factor which affects the ratio of binder to organophilic particles is the surface area of the organophilic particles. Typical talcs having a median particle size in the 5 micrometer size range have a surface area of about 6 square meters per gram. A 1:1 weight ratio of binder to talc is preferred for these materials. Talc particles having a median particle size of about 1 micrometer have a surface area of about 10 square meters per gram. When talc particles of this latter size range are used, a weight ratio of about 1:0.6 is preferred, i.e. only about 60% by weight of the more finely divided talc need be used to achieve an equivalent effect.

In general it has been found that articles comprising about 3 to 30% by weight binder and 3 to 20% by weight organophilic particles, and wherein the combined weight of binder and organophilic particles is about 10 to about 35% by weight of the total article, are preferred in the present invention. Most preferably the articles comprise about 10 to 20% by weight binder and 5 to 15% by weight organophilic particles with the combined weight of binder and organophilic particles being about 20 to about 30% by weight of the article.

A useful means of obtaining the articles of the present invention comprises physically admixing a solid, organic binder, organophobic, water-soluble nucleus particles and organophilic particles in a finely ground state, such as by tumbling the solid component admixture. The admixture can then be formed into a "green state" article of the desired size and shape, such as by molding or extruding, to provide tablets, pellets, prills, balls, rods or the like. As used herein, "green" or "green state" articles are those which are unfinished, but which have sufficient integrity to be carefully handled and processed. Articles in the green state require further heating and cooling to fuse the components into a finished coherent article. Accordingly, the articles in the green state are then heated to a temperature above the melting point of the binder, but below the melting point or degradation point of the remaining solid components. On heating, the binder becomes liquid and flows to the surface of, and throughout the interior of, the article forming a water-permeable coating around the agglomerate particles. On cooling (or on curing in the case of a polymerizable binder), the binder forms a solid matrix binding the agglomerate particles into a solid, coherent article.

The individual components of the admixture should be dry and can be predried before mixing if necessary to drive off excess moisture. It has been found that best results are achieved in the present invention when the moisture level is about 0.02% by weight or less. Any excess moisture will be released when the green state article is heated and the escape of this moisture from the green state article causes bubbles and voids in the finished article and causes poor adhesion of the binder to the solid particles. The net result of the presence of the excess moisture is an article having uncontrolled and rapid or non-uniform release characteristics, i.e., the water-soluble component may be released rapidly or a portion may be released rapidly while a portion is released slowly.

It is important that the solid, particulate components be homogeneously dry-blended, such as by tumbling, prior to molding or otherwise forming the article. Due to the nature of the components and particularly the relative size of the organophobic, water-soluble nucleus particles and the organophilic particles, the blending action provides agglomerate particles comprising organophobic, water-soluble nucleus particles surrounded by the smaller organophilic particles clinging thereto. This clinging relationship can result from the natural or static attractive forces between these small particles. Alternatively, the smaller oganophilic particles could be coated with an organophilic adhesive or organophilic thermoplastic material to bind the particles to the organophobic nucleus on contact or by heat fusion. This agglomeration could be accomplished as a separate step prior to admixing the resulting agglomerates with the binder. Usually, however, the natural or static attractive forces are sufficient to cause the particles to agglomerate and the organophilic particles will cling directly to the nucleus particles. It is essential in the practice of this method that the components be blended in the solid form so that the necessary contactual relationship will occur prior to fusion of the admixture. Blending the ingredients while the binder is in a liquid state will not accomplish the desired result since the presence of the liquid component during admixture can prevent the organophobic nucleus particles and organophilic particles from agglomerating in the necessary contactual manner.

As noted previously, a mixture of organic binders can be employed. Thus, a mixture of film forming binders or a mixture comprising film-forming binders and non-film-forming binders can be used.

Where a combination of binders is employed, the binders can be admixed in the solid state or can be pre-blended in the molten state, solidified and ground to the desired particle size prior to admixture with the other article components. With most resin combinations the latter melt pre-blend method is preferred. However, with certain combinations wherein a binder is employed in combination with an additional binder which has a lower melting point and/or a lower liquid surface energy, it is advantageous to admix these individual binders in the solid, particulate state rather than pre-blending them in the liquid state to form a single, solid binder component. This is because the binder having the lower melting point and/or lower surface energy will act as a "primer" component readily wetting the organophilic portion of the agglomerate particles and providing an extremely receptive surface for the remaining "coating" component.

In a preferred embodiment of this concept, polyethylene is used in combination with a hydrocarbon "priming" resin such as paraffin wax or a polyterpene resin such as the synthetic polyterpene resin "Wingtack" 95. During heating of the molded article the hydrocarbon priming resin will melt before the polyethylene melts, and, due to its relative low surface energy, the priming resin wets or "primes" the organophilic particles so that the polyethylene which subsequently melts and flows is more efficient in coating the primed, organophilic particles on the surface of the agglomerate particles.

Generally, the "coating" component, e.g. polyethylene, comprises at least 60% by weight of the total binder and the "primer" component, e.g. hydrocarbon resin, can comprise up to about 40% by weight of the total binder. Preferably the ratio of coating component to priming component is about 3 to 1. Binders comprising combinations of polyethylene and hydrocarbon priming resin admixed in the solid, particulate state can provide articles having a release time in a moist environment which is many times greater than for articles prepared using polyethylene alone, solidified melt pre-blends of polyethylene and hydrocarbon priming resin, or blends of other useful organic binders.

The articles of this invention are preferably formed by means which provide a green state article which has sufficient integrity to allow further handling and processing. Generally, known molding techniques or other known means of forming under pressure, such as extruding, are suitable. The forming pressure can affect the release characteristics of the finished article. An article which is formed under excessive pressure will expand greatly during any subsequent heating cycle, thereby creating voids and resulting in an article having an excessively fast or non-uniform release rate.

When conventional molding techniques are employed, the optimum holding pressure has been found to be about 6,000 to about 12,000 psi (422 − 844

Kg/cm²) in order to provide the most uniform sustained release properties. Articles in the shape of large tablets, balls or cubes can be conveniently produced by conventional molding techniques.

Another technique which has been found to produce useful articles is extrusion of the solid, particulate, binder/particle admixture into long rods which can be cut to the desired length to form green state pellets. These pellets can then be heated and subsequently cooled to cause the binder to flow and solidify, thereby providing a coherent pelletized product. The pellets find particular utility in applications where a large tablet would provide too large a dose of active ingredient, or where a given dosage must be distributed more uniformly over a large area.

The heating conditions for liquefying the binder in the green state articles which will provide the optimum release properties can vary, depending on the particular ingredients used and their ratios. Such factors as melting point, degradation temperature, specific heat and melt viscosity of the binder must be considered. Once these properties are known, the heating conditions can be readily determined for a particular composition. Generally when the surface of the heated article becomes visibly wet by the binder resin, the optimum temperature is reached. If the heating time is too short, the article will not be uniformly wetted. If the heating time is too long, the binder will flow and puddle around the bottom of the article. Either condition can detrimentally affect the rate and uniformity of the release properties. For articles having binder components comprising polethylene or polethylene/hydrocarbon priming resin combinations, heating temperatures up to about 130° C. are satisfactory. Superior results have been obtained by heating at 110° C. for about 25 to 35 minutes.

The invention can be illustrated by reference to the following examples wherein all parts and percentages are expressed as parts by weight and weight percent, unless otherwise indicated.

EXAMPLE 1

Tablets containing urea and monopotassium phosphate as the organophobic, water-soluble nucleus particles, polyethylene as the binder, and talc as the organophilic particles, were prepared and the release rates compared with tablets having no binder or organophilic particles and with tablets having only a binder resin. The three types of tablets were formulated as follows:

| Ingredient | I | II | III |
|---|---|---|---|
| Urea* | 50% | 40% | 35% |
| Monopotassium phosphate* | 50% | 40% | 35% |
| Polyethylene+ ("AC 617A" Allied Chemical Co.) | — | 20% | 16% |

-continued

| Ingredient | I | II | III |
|---|---|---|---|
| Talc ("C-400" United Sierra, 5 micrometer median size) | — | — | 14% |
| Tablet weight, grams | 7 | 8.6 | 10 |
| Mold pressure, Kg/cm² | 633 | 633 | 633 |
| Minutes heated at 130° C. | 0 | 14 | 14 |
| Tablet diameter, cm. | 2.54 | 2.54 | 2.54 |

Note: *Each tablet contained 7 grams of active ingredient, i.e. urea + monopotassium phosphate, −30 mesh crystals.
+Sieve anaylsis: +30 mesh, 1.05%; −30 +40, 2.75%; −40 +60, 31.93%; −60 +100, 53.08%; −100, 11.16%.

The tablets were prepared by predrying the talc, urea and monopotassium phosphate and dry-blending these ingredients with the particulate polyethylene until a homogeneous admixture was obtained. The blended ingredients were then placed in a tablet mold and formed under a pressure of about 633 Kg/cm² at ambient temperature. Tablets II and III which included the polyethylene binder resin were subjected to a heating cycle of 130° C. for 14 minutes. The surface of the tablet was uniformly wet by the binder during the heating cycle.

The rate of release of the water-soluble ingredient in the tablets was determined in a water solution. The tablets were each placed in a beaker containing 300 ml of distilled water and the change in conductivity (in $\mu$ mhos/cm) of the solution with time was measured by means of a conductivity bridge. The conductivity of the solution at various times was compared with the conductivity resulting when the water-soluble ingredients are totally released into the solution. From these data the weight percent of water-soluble ingredient released, as a function of time, was determined.

The time to release 100% of the water-soluble ingredient of tablet I above (no binder) was about 1 hour. Tablet II (binder without organophilic particles) released all of the water-soluble ingredient in less than 3 days while the tablet prepared according to the present invention, tablet III (binder and organophilic particles), released only about 40% of the water-soluble ingredient in 6 days. It has been found that a 3 day exposure to water in the above test is equivalent to about 10 inches (25.4 cm) of rainfall, while an exposure of 6 days is equivalent to 30 to 40 inches (76.2 − 101.6 cm) of rainfall. Thus, tablet III could provide a source of urea and monopotassium phosphate for a longer period of time than a tablet of formula II under similar conditions.

EXAMPLE 2

Tablets were prepared as in Example 1 using various organophilic particles having different oil absorption values as follows:

| Tablet Ingredient | Oil Absorption | Weight % of Total Tablet Weight | | | | | |
|---|---|---|---|---|---|---|---|
| | | Control | I | II | III | IV | V |
| Urea | | 40.0% | 34.75 | 34.75 | 34.75 | 34.75 | 34.75 |
| Monopotassium Phosphate | | 40.0% | 34.75 | 34.75 | 34.75 | 34.75 | 34.75 |
| Polyethylene "AC617A" | | 20.0% | 16.57 | 16.57 | 16.57 | 16.57 | 16.57 |
| Quartzite | 21.8 g. | 0 | 13.93 | 0 | 0 | 0 | 0 |
| Argillite | 29.1 g. | 0 | 0 | 13.93 | 0 | 0 | 0 |
| Micronized Silica | 31.9 g. | 0 | 0 | 0 | 13.93 | 0 | 0 |
| Talc ("C-400") | 41 g. | 0 | 0 | 0 | 0 | 13.93 | 0 |
| Talc ("Desertalc | 54.6 g. | 0 | 0 | 0 | 0 | 0 | 13.93 |

-continued

| Tablet Ingredient | Oil Absorption | Weight % of Total Tablet Weight | | | | | |
|---|---|---|---|---|---|---|---|
| | | Control | I | II | III | IV | V |
| Mikro 907", Desert Minerals, Inc.) | | | | | | | |
| Tablet Weight, grams | | 8.61 | 10 | 10 | 10 | 10 | 10 |

The release rate was measured as in Example 1. The control tablet released 100% of the water-soluble ingredient in about 2 days. After 6 days the remaining tablets had lost the following weight percent of water-soluble ingredient:

I, 95%; II, 75%; III, 60%; IV, 50%; and V, less than 40%.

EXAMPLE 3

Tablets were prepared as in Example 1 using a variety of thermoplastic resin binders and their efficacy compared. The resins were pre-blended in the melt state, resolidified, ground and screened through a 30 mesh screen.

| Tablet Ingredient | Weight % of Total Tablet Weight | | | | | |
|---|---|---|---|---|---|---|
| | I | II | III | IV | V | VI |
| urea | 80 | 70 | 40.4 | 34.8 | 40.4 | 34.8 |
| Monopotassium Phosphate | — | — | 40.4 | 34.7 | 40.4 | 34.7 |
| "Shellwax 700" (Shell Chemical Co.) | 15 | 15 | 4.8 | 4.1 | — | — |
| Polyterpene Resin ("Wingtack 95", Goodyear) | 5 | 5 | 5.8 | 5.0 | — | — |
| Polyethylene ("AC 617A") | — | — | 8.6 | 7.4 | — | — |
| Polyethylene ("AC 7" Allied Chemical) | — | — | — | — | 19.2 | 16.5 |
| Talc ("C-400") | — | 10 | — | 14 | — | 14 |
| Tablet weight, grams | 10 | 11.4 | 10 | 11.4 | 10 | 11.6 |

The release rate of the tablets was measured as in Example 1. After 4 days tablets I, III and V (no talc) had released 100% of the water-soluble ingredient, while tablet II had released 25%; tablet IV released 47%; and tablet VI had released 33% by weight of the water-soluble ingredient.

EXAMPLE 4

Tablets containing an aquatic herbicide and a plant growth regulator was prepared as described in Example 1.

| Tablet Ingredient | Weight Percent of Total Article | |
|---|---|---|
| | I | II |
| Sodium Endothall | 69.5 | — |
| Chlormequat ("Cycocel", Tech. grade) | — | 2.81 |
| *Polyethylene ("AC 617A") | 16.6 | 12.57 |
| *Synthetic Polyterpene Resin ("Wingtack" 95) | — | 4.2% |
| Talc ("C-400") 5 micrometer median size | 13.9 | — |
| Talc ("Mistron Superfrost", United Sierra) median particle size < 2 micrometers | — | 10.94 |
| Hydrobiotite (−30 mesh) | — | 10.14 |
| Sand | — | 59.34 |
| Tablet Weight | 10 | 15 |

*Dry-blended in particulate state in tablet II

The releae rate of each tablet was determined as in Example 1. Tablet I released about 70% by weight of the sodium endothall after 3 days. The chlormequat tablet (II) released about 51.2% by weight of the chlormequat after 3 days.

EXAMPLE 5

Tablets were prepared by the method described in Example 1 to show the effect of using various levels of binder and talc. The amount of talc was varied and two levels of polyethylene binder were employed, tablets V, VI and VII containing half as much binder, by weight, as tablets I – IV. The release rates of the tablets were measured as in Example 1 with the following results.

| Tablet Ingredients | Control | Weight Percent of Total Tablet | | | | | | |
|---|---|---|---|---|---|---|---|---|
| | | I | II | III | IV | V | VI | VII |
| Urea | 40 | 39.57 | 37.35 | 34.75 | 30.51 | 43.69 | 37.9 | 32.91 |
| Monopotassium Phosphate | 40 | 39.57 | 37.35 | 34.75 | 30.51 | 43.69 | 37.9 | 32.91 |
| Polyethylene ("AC 617A") | 20 | 18.87 | 17.81 | 16.57 | 14.55 | 10.41 | 9.03 | 7.84 |
| Talc | — | 1.99 | 7.49 | 13.93 | 24.43 | 2.21 | 15.17 | 26.34 |

-continued

| Tablet Ingredients | Control | Weight Percent of Total Tablet | | | | | | |
|---|---|---|---|---|---|---|---|---|
| | | I | II | III | IV | V | VI | VII |
| ("C-400") | | | | | | | | |
| Tablet Weight, grams | 8.61 | 8.78 | 9.3 | 10.0 | 11.39 | 7.95 | 9.17 | 10.56 |
| % Released After 4 Days | 100 (2 days) | 72 | 40 | 35 | 25 | 93 | 45 | 42 |

Tablets I – VII provided release times in excess of 4 days, whereas the control tablet without the organophilic talc additive released all of its contents in less than 2 days. Tablets having various release rates can be prepared by varying the amount of organophilic particles, such as talc, added to the formulation.

EXAMPLE 6

Tablets were prepared using a combination of polyethylene and a hydrocarbon priming resin as the binder. The binder components were blended in the solid state.

| Tablet Ingredient | Weight Percent of Total Tablet | | | | | |
|---|---|---|---|---|---|---|
| | I | II | III | IV | V | VI |
| | (control) | | | | | |
| Urea | 49.5 | 45.39 | 45.39 | 45.39 | 45.39 | 45.39 |
| Monopotassium Phosphate | 49.5 | 23.14 | 23.14 | 23.14 | 23.14 | 23.14 |
| Chelated Iron ("Sequestrene" 330, Ciba - Geigy) | 1.0 | 1.0 | 1.0 | 1.0 | 1.0 | 1.0 |
| Polyethylene ("AC 617"A) | — | 16.57 | 14.91 | 12.43 | 9.94 | 12.34 |
| Paraffin Wax ("Shellwax 700") | — | — | 1.66 | 4.14 | 6.63 | — |
| Synthetic Polyterpene Resin ("Wingtack" 95) | — | — | — | — | — | 4.14 |
| Talc ("C-400") | — | 13.93 | 13.93 | 13.93 | 13.93 | 13.93 |
| Tablet Weight, grams | 10.3 | 15 | 15 | 15 | 15 | 15 |

The tablets were prepared as in Example 1, except that the molded tablets were heated at 110° C. for 30 minutes and subsequently cooled to solidify the mixture.

The release rate of the tablets was measured as in Example 1. The control tablet had released 100% of the water soluble ingredient in about 1 hour. After 4 days Tablet II containing no paraffin wax had released about 38% of the water soluble active ingredient. The tablets containing the combination of polyethylene and paraffin wax had released the following % of water soluble ingredient after 4 days:

III - 27%; IV - 22%; and V - 36%.

The combination of polyethylene and polyterpene resin (VI) had released 10.9% of the water soluble ingredient after 4 days.

We claim:

1. Article for providing sustained release of water-soluble chemicals in a moist environment said article comprising a plurality of agglomerate particles each comprising organophobic, totally water-soluble nucleus particles substantially surrounded by organophilic particles clinging thereto, said organophilic particles being less than about one-tenth the size of said nucleus particles and having an oil absorption value of from about 30 to the maximum oil absorption value for talcs, said organophilic particles comprising about 5 to about 15 percent of the total weight of the article, said agglomerate particles being bound into a solid coherent mass by a water-permeable matrix of water-insoluble binder comprising a resin having a liquid viscosity of 250 to 750 centipoise at a temperature below the degradation temperature of the remaining components of the article.

2. An article according to claim 1 wherein said organophilic particles are in direct contact with said nucleus particles and wherein the surface of said agglomerate particles consists of portions of the surface of said organophobic nucleus particles and portions of the surface of said organophilic particles.

3. An article according to claim 2 wherein the median size of said organophilic particles is about 5 micrometers or less.

4. An article according to claim 1 wherein the size of said organophobic, water-soluble nucleus particles is about 100 to 600 micrometers and the size of said organophilic particles is about 60 micrometers or less.

5. An article according to claim 1 wherein said water insoluble binder comprises a film-forming resin.

6. An article according to claim 1 wherein said resin comprises polyethylene.

7. An article according to claim 1 wherein said water-insoluble binder comprises 60 to 100% by weight polyethylene and up to 40% by weight of a hydrocarbon resin having a melting point lower than said polyethylene.

8. An article according to claim 7 wherein said hydrocarbon resin is selected from the group consisting of paraffin wax and synthetic polyterpene resins.

9. An article according to claim 1 wherein said organophilic particles are talc particles.

10. An article according to claim 1 comprising 3 to 30% binder and wherein said organophilic particles and said binder combined comprise 10 to 35% by weight based on the total weight of the article.

11. An article according to claim 1 comprising 10 to 20% by weight binder and wherein said organophilic particles and said binder combined comprise 20 to 30% by weight based on the total weight of the article.

12. An article according to claim 1 wherein said organophobic water-soluble nucleus particles are agrichemicals selected from the group consisting of fertilizers, herbicides, pesticides, and plant growth regulators.

13. An article according to claim 1 in the form of a tablet or pellet.

14. A tablet for providing sustained release of plant fertilizer in a moist environment, said article comprising a plurality of agglomerate particles, each comprising a nucleus of organophobic, totally water-soluble fertilizer 100 to 600 micrometers in size and surrounded by talc particles clinging thereto, said talc particles having a median particle size of about 5 micrometers or less and comprising about 5 to 15 percent of the total weight of the article, said agglomerate particles being bound into a solid coherent tablet by a water-permeable matrix comprising 60 to 100% by weight polyethylene and up to 40% by weight paraffin wax.

15. A method of making an article for providing sustained release of water-soluble chemicals in a moist environment comprising the steps of:
I. homogeneously dry-blending
 (a) organophobic, totally water-soluble particles having a particle size of about 100 to 600 micrometers,
 (b) organophilic particles having a particle size of about 60 micrometers or less, and
 (c) particulate, water-insoluble, film-forming, thermoplastic resin to provide a blended mass;
II. forming and subsequently heating said blended mass to a temperature and for a time sufficient to flow the thermoplastic resin throughout said mass; and
III. cooling the formed mass to provide a solid coherent article.

16. A method according to claim 15 wherein said organophilic particles have a median particle size of about 5 micrometers or less.

17. A method according to claim 15 wherein said blended mass is formed into a tablet.

18. A method according to claim 15 wherein said forming step comprises extruding said blended mass into rods and cutting said rods into short lengths to form pellets.

19. An article according to claim 1 wherein said organophilic particles have an oil absorption value of from about 30 to about 55.

20. An article according to claim 1 wherein said organophilic particles are talc.

* * * * *

UNITED STATES PATENT AND TRADEMARK OFFICE
CERTIFICATE OF CORRECTION

PATENT NO. : 4,011,061
DATED : March 8, 1977
INVENTOR(S) : Roger K. Forseen and David A. Hofacker It is certified that error appears in the above-identified patent and that said Letters Patent are hereby corrected as shown below:

Column 11, line 41, capitalize -- Urea -- (the first word in the extreme left column in the table).

Column 13, line 58, insert a comma (,) after "environment".

Column 14, line 62, after "30%" insert -- by weight -- .

Signed and Sealed this

Seventh Day of March 1978

[SEAL]

Attest:

RUTH C. MASON
Attesting Officer

LUTRELLE F. PARKER
Acting Commissioner of Patents and Trademarks